INVENTORS
KATSUHIRO OKUBO
ATSUYUKI UENO

○ Na₂SO₄ added
● NaCl added

FIG.8
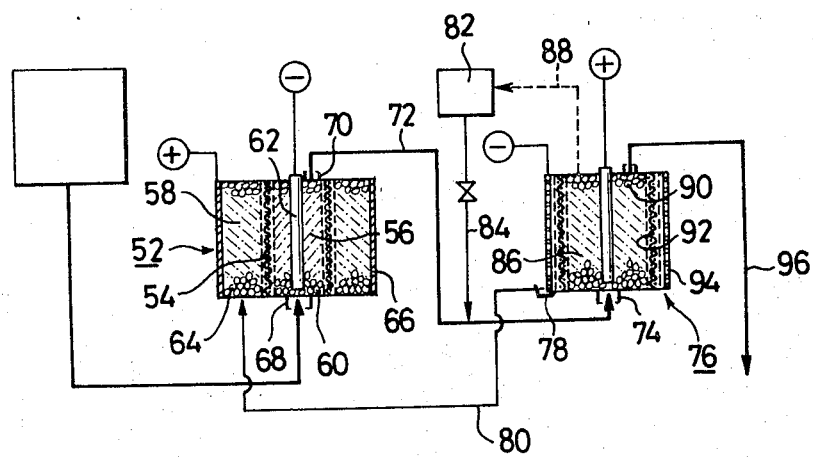
FIG.9
FIG.10
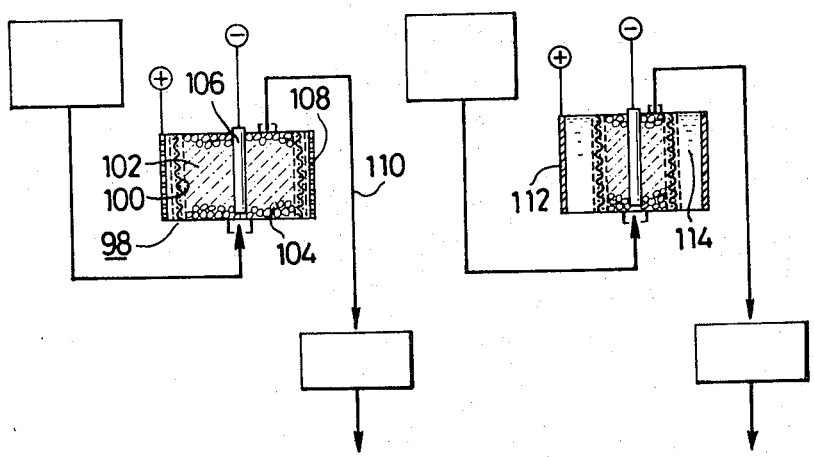
INVENTORS
KATSUHIRO OKUBO
ATSUYUKI UENO United States Patent Office 3,764,499
Patented Oct. 9, 1973

3,764,499
PROCESS FOR REMOVAL OF CONTAMINANTS FROM WASTES
Katsuhiro Okubo, 9–12, 6-chome, Higashi-Mukoujima, Sumida-ku, and Atsuyuki Ueno, 454, 1-chome, Soshigaya, Setagaya-ku, both of Tokyo, Japan
Filed Nov. 23, 1971, Ser. No. 201,399
Claims priority, application Japan, Nov. 26, 1970, 45/104,213
Int. Cl. B01d 13/02; C02b 1/82; C02c 5/12
U.S. Cl. 204—151
4 Claims

ABSTRACT OF THE DISCLOSURE

In a process for continuous removal of contaminants including cyanides and toxic metals such as copper, zinc, silver, chromium, cadmium and others by the electrolytic process, an electrolytic cell is partitioned by a membrane into at least two electrolytic chambers which are filled with electric conductors in a granular, fibrous or segmental form with positive and negative major electrodes respectively thereby to form an anode chamber and a cathode chamber in abutting relation through the membrane. In accordance with the properties of contaminants or the presence of cyanides, the rinse water is selectively led into the anode chamber or the cathode chamber to effect the reduction and/or oxidation with decomposition of the toxic metals and cyanides so that the pollution concentration of the rinse water is lowered. The rinse water with poor pollution content is then migrated through the membrane into the cathode chamber or the anode chamber to bring a further reduction and/or oxidation with decomposition of the residual metals and cyanides for removal or destruction of the contaminants from the rinse water. The anode chamber or the cathode chamber filled with the granular or fibrous conductors with major electrodes may be replaced by a porous conductive metal sleeve.

---

This invention relates to a process and an apparatus for continuous removal of contaminants including cyanides and toxic metals such as copper, zinc, silver, chromium, cadmium and others from the rinse water.

Heretofore, many attempts have been brought out to remove or decompose toxic contaminants contained in the wastes such as plating waste water, etching waste, acid rinsing waste water and other chemical treatments, for example by a chemical reaction for precipitation of the toxic metals in the forms of hydroxide or oxide. Such the chemical reaction process, however, usually requires an installation of excessive volume and floor space with a prolonged time for collection of deposits leaving serious problem of the cumbersome aftertreatment of the precipitated slugs.

In order to remove the contaminants from the wastes with an installation of relatively simple construction, it is known to use an electrolytic process although it usually requires an agitation of the liquid or both in the electrolytic cell or an expansion of electrode to obtain a possibly sufficient electrolysis because of the dilute rinse water of low electrolytic concentration following a considerable power consumption and an extended time for the electrolysis.

In another aspect, the chemical reaction process and the electrolytic process are used in combintion, notwithstanding the treating process is rendered rather complicated with increased time and cost.

To improve the foregoing disadvantages and difficulties, the inventors first stood on the assumption that if the electrode area could be considerably expanded with the utmost access of electrodes on the basis of the conventional electrolytic cell, a sufficient electrolysis with a high electric current efficiency at a short time might be accomplished even for the dilute rinse water of low electrolytic concentration.

After an extensive research, the inventors discovered that when the electrolytic cell is filled by the electric conductors consisting of granular or fibrous materials with major electrodes and a voltage is applied between the electrodes, the granular or fibrous electric conductors have abilities to bring the electrode reactions like the major electrodes with a remarkable expansion of the electrode area and a marvelous contraction of distance between electrodes so that the contacting efficiency between the electrolyte or bath and the electrodes is considerably increased in cooperation with the constrained flow of the rinse water through the granular or fibrous electric conductors.

A further study has brought the inventors to trace the following results:

(1) The metals contained in the rinse water usually include less decomposable compounds such as a cyanide compound. Such the compounds, however, may be shifted into the decomposable condition by a previous addition of an alkali solution of the predetermined amount to the rinse water.

(2) When an electrolytic cell is partitioned by a membrane into an anode chamber and a cathode chamber, an alkali ion of the alkaline rinse water led into the anode chamber migrates through the membrane into the cathode chamber entailing a considerable increase of the contacting efficiency between the toxic metals and electrodes whereby the reduction and/or oxidation with decomposition of the metals and cyanides are impelled while the separated alkali solution is recirculated into the supply line of the rinse water for reuse thereof.

(3) In case of removing contaminants particularly including cyanides and toxic metals from the rinse water of high pollution concentration, a first electrolytic cell is preferably partitioned by a membrane into an anode chamber and a cathode chamber which is filled by solid conductors of metallic particles with a negative major electrode while the former is filled by solid electric conductors of graphite particles with a positive major electrode immersed in the alkali solution. The rinse water intended to treat is first led into the cathode chamber to effect a partial reduction of the toxic metals for separation while the alkali ion in the anode chamber migrates through the membrane into the cathode chamber to render the toxic metals decomposable with a counter migration of a part of cyanides through the membrane into the anode chamber for oxidation whereby the contents of toxic metals and cyanides in the rinse water is reduced considerably. The rinse water thus previously treated is further passed through a duct into the anode chamber of a second electrolytic cell which is partitioned by a membrane into an anode chamber which is filled by solid electric conductors of graphite particles with a positive major electrode and a cathode chamber of porous conductive metal sleeve so that the cyanide ions are fairly oxidized with decomposition and precipitation of the metal ions among the anode particles. The alkali solution in the rinse water when passing through the anode chamber migrates through the membrane into the cathode chamber for recovery. The metal ions deposited on the anode particles when required for cleaning may be dissolved and removed by passing an extract of ammonium chloride and ammonia through the anode particles while ceasing the electrolysis.

(4) In case of removing toxic metals from the rinse water free from cyanides, the rinse water is led into the cathode chamber of the electrolytic cell which is partitioned into a cathode chamber filled by solid electric conductors of metal particles with a negative major electrode and an anode chamber of porous conductive metal sleeve to effect the reduction of majority of metal ions for separation and the resulting effluent is neutralized by an addtion of the alkali solution when desired and subsequently filtered out in the form of precipitates.

(5) Since a considerable expansion of the electrode area minimizes the current density at the anode, the consumption of graphite conductors is effectively saved as compared with the conventional electrolytic process. The consumed graphite may be supplemented by a mere additional filling operation of fresh graphites which enables a complete consumption of the graphite. The electric conductors composed of platinum or titanium particles do not meet a substantial consumption.

(6) The high electrolysis efficiency enables to minimize the volume of the electrolytic cell and the effluent may be directly discharged outside of the cell. The invented electrolytic cell may be installed in the outdoors at a low cost.

It is therefore a general object of the invention to provide a novel process and apparatus for prompt and tangible removal and decomposition of contaminants including cyanides and toxic metals in the wastes by an electrolytic process.

A principal object of the present invention is to provide a process for removal and decomposition of contaminants from the wastes which comprises leading the rinse water into an anode chamber which is filled by granular or fibrous electric conductors with a positive major electrode or into a cathode chamber which is filled by granular or fibrous electric conductors with a negative major electrode of the electrolytic cell partitioned by a membrane to effect reduction and/or oxidation with decomposition of the contaminants and migrating the residual contaminants through the membrane into the cathode chamber or the anode chamber for a further reduction and oxidation with decomposition of contaminants.

Another object of the present invention is to provide an apparatus for removal and decomposition of contaminants from the wastes comprising an electrolytic cell which is partitioned by a membrane into an anode chamber and a cathode chamber, said anode and cathode chambers being filled by granular or fibrous electric conductors with positive and negative major electrodes respectively.

As the granular or fibrous electric conductors to be filled into the anode chamber and the cathode chamber, use may be made of conductive granular materials such as graphite and metal particles, conductive fibrous materials or conductive segmental materials together with the major electrodes and preferably with an auxiliary electrode such as a net electrode to obtain a uniform current distribution. The platinum particles and titanium particles may also be used as the electric conductors in accordance with the present invention although costly.

The membrane herein used may be of usual ion-exchange membrane or parchment paper which may be stabilized by an asbestos diaphragm.

In case the electrolytic cell is designed in a cylindrical shape, the anode chamber or the cathode chamber may, preferably, be constructed by a porous conductive metal sleeve.

In consequence, it is a further object of the present invention to provide an apparatus for removal and decomposition of contaminants including cyanides and toxic metals from the rinse water comprising an electrolytic cell which is partitioned by a membrane into at least two polar chambers, one polar chamber being filled with granular or fibrous electric conductors with a major electrode while other polar chamber being formed of a porous conductive metal sleeve.

The electrolytic cell of the type in accordance with the present invention may be connected in series for several units so that when the pollution concentration gets over the capacity of the first electrolytic cell, the residual contaminants in the first electrolytic cell may be subjected to a further electrolytic process in the second and third cells.

Thus, a furthermore object of the present invention is to provide an apparatus for removal and decomposition of the contaminants from the wastes which comprises two or more electrolytic cells connected in series, individual electrolytic cell being partitioned by an anion-exchange membrane into an anode chamber which is filled by granular or fibrous electric conductors with a positive major electrode and a cathode chamber which is filled by granular or fibrous conductors with a negative major electrode.

In the removal of the metals deposited on the anode particles or the cathode particles, an extract of approximately 15% by weight of ammonium chloride and ammonia with pH of 10 is constrained by a circulation device to flow through the anode particles or the cathode particles thereby to dissolve and remove the deposited metals and the dissolved extract is further led to the additional electrolytic cell to obtain scraps of the metals by the electrolytic process although the solid electric conductors deposited with the metals may be substituted with fresh electric conductors.

It is therefore an additional object of the present invention to provide an apparatus for removal and decomposition of contaminants from the wastes comprising an electrolytic cell which is partitioned by a diaphragm into an anode chamber which is filled with granular or fibrous conductors with a positive major electrode and a cathode chamber which is filled with granular or fibrous conductors with a negative major electrode, the electrolytic cell being associated with a circulation device of an extract for dissolution of the metals deposited on the anode particles or the cathode particles.

Another important object of the present invention is to provide a process for removal and decomposition of contaminants including cyanides and toxic metals from the rinse water of relatively high concentration which comprises passing the rinse water through a cathode chamber of a first electrolytic cell which is partitioned by an anion-exchange membrane into the said cathode chamber which is filled by granular or fibrous electric conductors with a major electrode and an anode chamber which is filled by granular or fibrous electric conductors with a major electrode immersed in an alkali solution to effect a reduction reaction of the metal ion with oxidation of cyanide ion thereby to lower the contents of the metal ion and cyanide ion in the waste water pH of which being modulated into an optimum value for decomposition of cyanide due to the migration of the alkali solution from the anode chamber through an anion-exchange membrane into the cathode chamber, leading the treated rinse water of low cyanide and metal contents into an anode chamber of the second electrolytic cell which is partitioned by a cation-exchange membrane into an anode chamber which is filled by graphite particles with a major electrode and a cathode chamber of porous conductive metal sleeve to oxidate the cyanide ion and deposit the metals on the anode particles and recirculating the alkali solution through the porous cathodic sleeve into the anode chamber of the first electrolytic cell.

Other objects and advantages of the present invention will become readily apparent and be understood from the following description of embodiments by way of example, reference being made to the accompanying drawings in which the same reference numerals designate the same or similar parts throughout the drawings.

Figure 6:
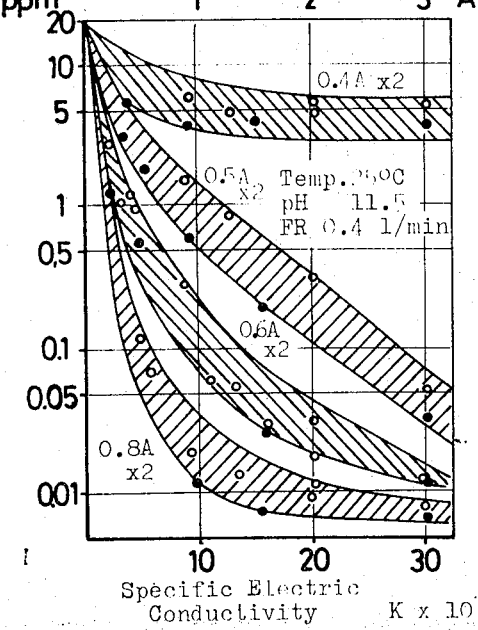
Figure 7:
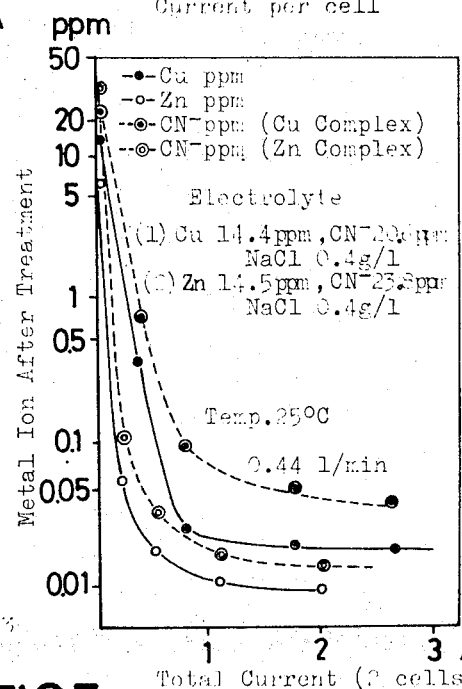

FIG. 6. is a diagram showing an influence of the specific electric conductivity on the decomposition of cyanide;

FIG. 7 is a diagram showing a relationship between the current and the cyanide-metal concentration after the electrolytic treatment;

FIG. 8 is a pictorial view of the device for removing and decomposing contaminants from the waste water of high cyanide concentration;

FIG. 9 is a pictorial view of the device for removing and decomposing contaminants free from cyanide; and FIG. 10 is a pictorial view similar to FIG. 9 of the device of another embodiment.

Figure 1:
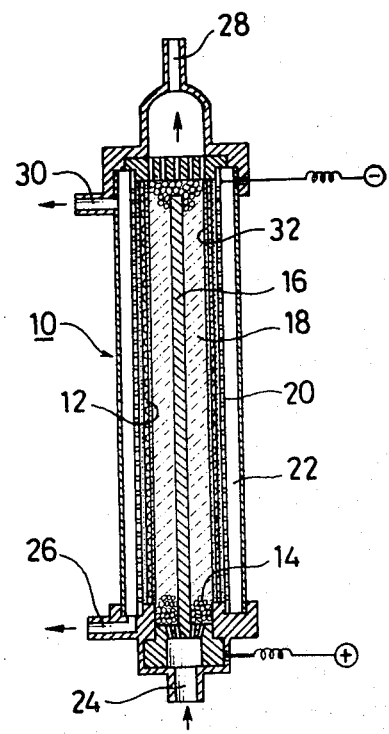
FIG. 1 is a longitudinally sectioned elevation of the device for embodying the process in accordance with the present invention.

Referring to FIG. 1, an apparatus for removing and decomposing the toxic metals and cyanides from the waste water comprises an electrolytic cell 10 which is partitioned by a cation exchange membrane 12 into two polar chambers one of which is filled by graphite particles 14 with a major electrode 16 to form an anode chamber 18 and another polar chamber is composed of a porous conductive sleeve 20 of approximately 55% porosity to form a cathode chamber 22.

The anode chamber 18 is provided at its bottom portion with a water inlet 24 and an alkali solution outlet 26 and at its top portion with a water outlet 28 and an exhaust port 30. The cation exchange membrane 12 is sandwiched by asbestos diaphragms 32 to give additional strength thereto.

EXAMPLE I

Figure 3:
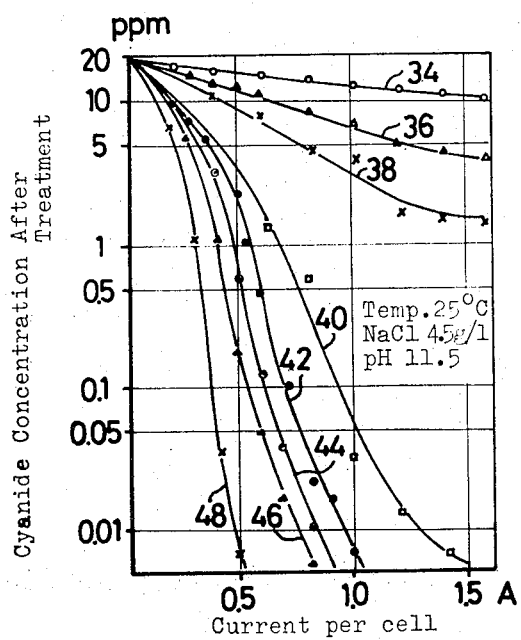
FIG. 3 is a diagram showing a relationship between the flow rate and the current exercised in connection with the waste water of 20 p.p.m. cyanide content.
Figure 4:
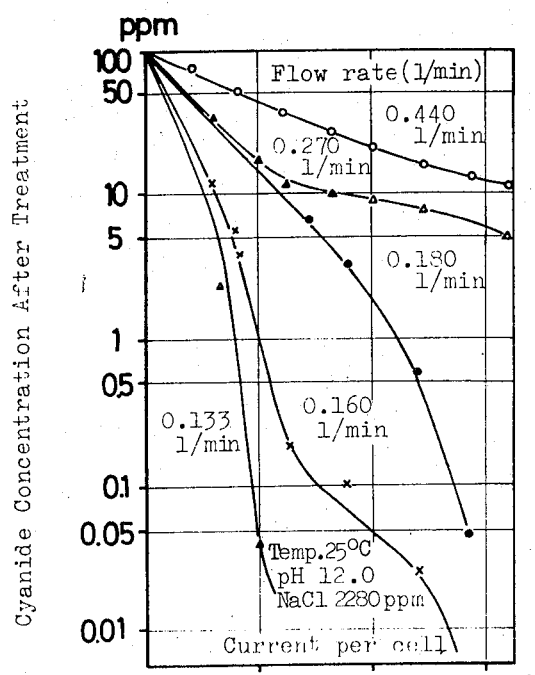
FIG. 4 is a diagram showing a relationship between the flow rate and the current exercised in connection with the waste water of 100 p.p.m. cyanide content.
Figure 5:
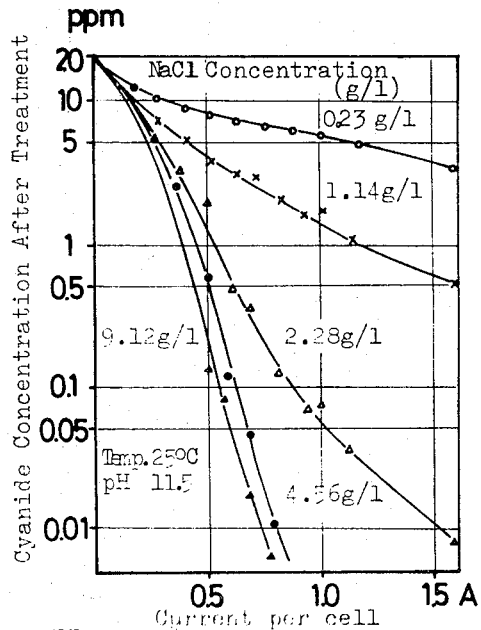
FIG. 5 is a diagram showing an influence of NaCl concentration of the electrolyte.

A volume of the anode chamber 18 was provided at proximately 2660 ml. with 55% voids of graphite particles following an effective volume of proximately 1330 ml. As the electrolytic bath, KCN solutions including 20 p.p.m. cyanide and 100 p.p.m. cyanide were used at pH of 11.5 or 12.0 with NaOH. NaCl or $Na_2SO_4$ in a proper amount was added to increase the electric conductivity while keeping the liquid temperature at proximately 20° C. The electrolytic bath thus modulated was urged from the inlet 24 into the anode chamber 18 for uniform oxidation and decomposition reactions therein and the metal ions thus oxidized and decomposed deposited on the anode particles 14. The alkali solution migrated through the asbestos diaphragm 32 and the ion-exchange membrane 12 into the cathodic sleeve 22 and in turn flowed down over the peripheral surface of the cathodic sleeve 22 and directed to the recirculation system of the alkali solution through the outlet 26. Further, the hydrogen gas produced by the oxidation reaction was exhausted through the exhaust port 30 at the top of the electrolytic cell and the effluent is ultimately discharged in almost neutralized property at pH of 6.5 to 7.5. FIG. 3 illustrates the mutual relations between the flow rate, the electric current and the cyanide concentration taken in connection with the 20 p.p.m. cyanide solution. FIG. 4 also shows the relations between the flow rate, the electric current and the cyanide concentration taken in connection with the 100 p.p.m. cyanide solution. In both examples, it has been appreciated that the residual cyanide concentration was lowered to $10^{-1}$ p.p.m. and even $10^{-2}$–$10^{-3}$ p.p.m. at the lowermost with the proviso that the flow rate and the electric current have suitable values. Considering the relations between the flow rate and the electric current with reference to FIG. 3 for providing a certain proper residual cyanide concentration, the curves 40 to 48 provide a substantially constant ratio between the flow rate and the electric current while the curves 34 to 38 provide an irregular ratio therebetween. FIG. 4 shows the similar results. These data suggest that the flow rate against the effective volume or the liquid content of the anode chamber is an important factor. That is, it is presumed that an excessively short residence in the electrolytic cell lowers the contacting efficiency between the electrode and the solution. In case of 100 p.p.m. cyanide concentration, the residual cyanide concentration had a substantially linear value with the proviso that the flow rate is proximately ⅕ time that of the 20 p.p.m. cyanide concentration which implies that consideration of the ratio between the concentration and the flow rate is sufficient. FIG. 5 illustrates the example wherein the NaCl contents in the electrolytic bath were varied. The diagram shows that an increase of the NaCl concentration impels the decomposition of the cyanide, although an addition of NaCl is not absolutely necessary as best shown in FIG. 6. Instead of NaCl, use may be made of $Na_2SO_4$ preferably with a specific electric conductivity of proximately $5\times10^{-3}\Omega^{-1}$ cm.$^{-1}$ and positively $10\times10^{-3}\Omega^{-1}$ cm.$^{-1}$ or more.

The concentration of sodium chloride in the anodic bath was analyzed for the cases wherein the sodium chloride of from 10 to 30 times the theoretical amount required for the decomposition was added. The analysis showed that the chloride ion of higher concentration brings a more efficiency, notwithstanding the concentration of 10 to 20 times the theoretical amount is preferred in an economical point of view. A further comparative experiment was exercised between an anodic bath containing the chloride ion and that free from the chloride ion with the result that the anodic bath containing chloride ion brought a high efficiency particularly at the low electric current density. Since, however, the waste water even free from the chloride ion often contains the electrolytes such as sodium sulfate, sodium carbonate, sodium hydroxide and others, it has been appreciated that the decomposition of almost the same efficiency is accomplished with the proviso that the specific electric conductivity thereof is proximately $5\times10^{-3}$ or $10\times10^{-3}\Omega^{-1}$ cm.$^{-1}$ or more. Moreover, the temperature ranges of the waste water were measured at 15° C., 250° C. and 45° C. The decomposition efficiency at each range was substantially linear level and no substantial influence of the temperature could be traced.

Now again back to FIG. 2 which shows several electrolytic cells similar to the cell as shown in FIG. 1 connected in series through a pipe 50. In accordance with this installation, when the pollution concentration of the waste water were measured at 15° C., 25° C. and 45° C. A, the waste water containing residual contaminants including undecomposed cyanide ion and metal ion may be further subjected the electrolysis at the second cell B for additional removal and decomposition operations and when desired led into the third cell C for the perfect removal and decomposition of cyanide ion and toxic metal ion.

Figure 2:
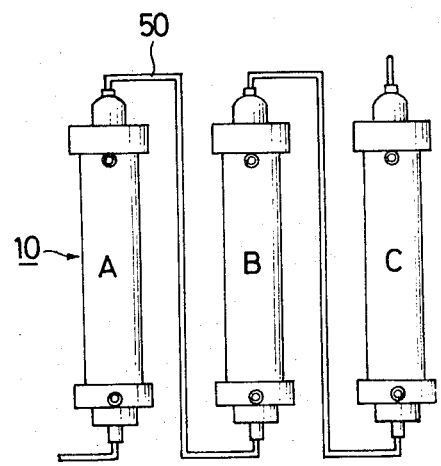
FIG. 2 is a pictorial front elevation of the device of FIG. 1 but connected in series for several units.

FIG. 8 shows an alternative embodiment of the multiple type electrolytic cell system as shown in FIG. 2 particularly designed for treatment of the water of the higher cyanide concentration wherein a first electrolytic cell 52 is partitioned by an anion exchange membrane 54 to provide a cathode chamber 56 and an anode chamber 58. The cathode chamber 56 is filled with the conductive metal particles 60 with a negative major electrode 62 while the anode chamber 58 is filled graphite particles 64 immersed in an alkali solution with a positive major electrode 66 encircling the graphite particles 64. The cathode chamber 56 is provided at its bottom portion with a waste water inlet 68 and at its top portion with an outlet 70 which is further connected to a pipe 72 communicating into a bottom inlet 74 of a second electrolytic cell 76 of the substantially same construction as that shown in FIG. 1. From a receiver 78 for the alkali solution, a feed pipe 80 is led into the anode chamber 60 of the first electrolytic cell 52. The second electrolytic cell 76 is provided in abutment relation with a storage tank 82 for the rinsing extract from the bottom of which a pipe 84 is derived into the bottom of the anode chamber 86 of the second electrolytic cell 76. A pipe 88 is derived from the top of the anode chamber 86 into the storage tank 82.

In the typical operation of removing and decomposing cyanide ion and metal ion from the waste water with the foregoing device, the waste water is first introduced into the cathode chamber 56 of the first electrolytic cell 52 wherein the toxic metals in the waste water are partially subjected to the reduction reaction for separation in the form of slugs which are deposited on the metal particles 60. A part of alkali solution reserved in the anode chamber 58 migrates through the anion exchange membrane 54 into the cathode chamber 56 to modulate the hydrogen ion concentration (pH) of the waste water to proximately 10 to 12. On the other hand, cyanides in the waste water are partially migrate through the anion exchange membrane 54 into the anode chamber 58 for oxidation under the influence of the anodic particles 64. Thus, the concentrations of toxic metals and cyanides in the waste water are lowered considerably with the moderation of pH to the optimum value of 10 to 12 for the oxidation of cyanide.

The waste water treated in the first electrolytic cell 52 is then led through the pipe line 72 into the anode chamber 86 of the second electrolytic cell 76 wherein the residual cyanide ions are oxidized and also the remaining metal ions are decomposed for precipitation on the anodic particles 90. The alkali solution contained in the waste water migrates through the cation exchange membrane 92 and flows down along the periperhal surface of the porous cathode sleeve 94 into the receiver 78 and then fed back into the anode chamber 58 of the first electrolytic cell 52 to establish a recirculation system of the alkali solution. The effluent is discharged outside of the device through the drain pipe 96. The storage tank 82 reserves an extract of 15% ammonia chloride and ammonia which is circulated into the anode chamber 86 of the second electrolytic cell 76 when rinsing the anodic particles 90 deposited with contaminants by ceasing the electrolytic operation. By this operation, the toxic metal slugs such as copper, zinc, nickel, cadmium and the like are dissolved and the dissolution thus obtained is further subjected to another electrolytic process to separate the metals and the purified extract is fed back into the storage tank 82 for reuse.

EXAMPLE II

The extract in 10 liter was passed through the anodic particles to dissolve about 80% by weight of slugs out in several minutes. The metal concentrations of the extract were 21.3 p.p.m. copper, 16.2 p.p.m. zinc and 6.3 p.p.m. nickel. The extract was further subjected to the electrolytic process at the cathode chamber to separate the metals out with substantially the same concentrations as the original extract. Thus, the concentration of the extract was lowered to 1 p.p.m. or less. FIG. 7 shows the relation between the electric current and the concentrations of cyanide and metal after treatment exercised in connection with the complex cyanate solution of copper and zinc. The copper and zinc concentrations in the solution after treatment were lowered to 0.01 to 0.02 p.p.m. Although the cyanide concentration is inferior to the alkali cyanide solution alone, the current efficiency got over 80%.

FIGS. 9 and 10 show devices for removing and decomposing the toxic metals free from the cyanide from the waste water.

The device shown in FIG. 9 has substantially the same construction as the first electrolytic cell of the device of FIG. 8. In this embodiment, the electrolytic cell 98 is partitioned by the anion exchange membrane 100 into a cathode chamber 102 which is filled with conductive metal particles 104 with a negative major electrode 106 and an anode chamber of porous conductive metal sleeve 108. On passing of the waste water through the cathodic metal particles 104, the metal ions are deposited on the metal particles by the reduction reaction whereas the sulfate ion, the chloride ion and the like migrate through the anion exchange membrane 100 for conversion into a sulfuric acid and a hydrochloric acid and the like respectively and are discharged through the porous anodic sleeve for neutralization by an addition of alkali solution. The effluent is discharged from the top of the cathode chamber 102 through a drain pipe 110 to the outside of the device. If the effluent is not fairly neutralized, it is preferable to add a suitable amount of alkali solution to the effluent for neutralization to obtain pH of proximately 7. The negligible amount of the residual metals in the waste is precipitated and filtered out.

In the electrolytic cell as best shown in FIG. 10, the porous anodic sleeve 108 used in the electrolytic cell of FIG. 9 is replaced by an anodic cell 112 which is filled with a liquid 114 adapted to bubble the gas produced the oxidation reaction.

In accordance with the present invention, a sufficient electrolysis may be accomplished by a device of simple construction which enables to carry out continuous and effective removal and decomposition of contaminants including cyanides toxic metals and others from the wastes of high as well as low concentration.

While certain preferred embodiments of the invention have been illustrated by way of example in the drawings and particularly described, it will be understood that modifications may be made in the constructions and that the invention is no way limited to the embodiments shown. For example, when the anode chamber of the electrolytic cell is filled by granular, fibrous or segmental conductors with a major electrode the cathode may be formed of a plate or sleeve configuration whereas when the cathode chamber is filled by granular, fibrous or segmental conductors an anode may be formed of a plate or sleeve configuration or the cathode and anode chambers may be selectively filled with the granular, fibrous or segmental conductors as the case may be.

We claim:

1. A process for removal and decomposition of contaminants from the waste water which comprises leading the waste water into a cell having a first major electrode chamber which is filled by granular or fibrous electric conductors and a major electrode, said first major electrode chamber being separated from a second electrode chamber of opposite polarity by an ion exchange membrane, applying a potential across a cell constituted by said first and second electrode chambers to effect an electrolytic reaction with decomposition of the contaminants in the first major electrode chamber and with migration of the residual contaminants through the membrane into the second electrode chamber for further electrolytic reaction with decomposition.

2. The process of claim 1 wherein said first major electrode chamber is the anode chamber and said second electrode chamber is the cathode chamber.

3. The process of claim 1 wherein said first major electrode chamber is the cathode chamber and said second electrode chamber is the anode chamber.

4. A process for removal and decomposition of contaminants including cyanides and toxic metals from the waste water of high concentration which comprises passing the waste water through a cathode chamber of a first electrolytic cell which is partitioned by an anion-exchange membrane into the cathode chamber which is filled by granular or fibrous electric conductors with a major electrode and an anode chamber which is filled by granular or fibrous electric conductors with a major electrode immersed in an alkali solution to effect a reduction reaction of the metal ion with oxidation of cyanide ion with migrations of a part of alkali solution from the anode chamber through the anion-exchange membrane into the cathode chamber and of a part of cyanides from the cathode chamber through the anion-exchange membrane into the anode chamber for oxidation, leading the treated waste water of lowered cyanide and metal concentration into an anode chamber of a second electrolytic cell which is partitioned by a cation-exchange membrane into an anode chamber which is filled by granular and fibrous conductors with a major electrode and a cathode chamber of porous conductive metal sleeve to oxidate and decompose the residual cyanide ion and metal ion and recirculating the alkali solution through the porous metal sleeve into the anode chamber of the first electrolytic cell.

References Cited

UNITED STATES PATENTS

| | | | |
|---|---|---|---|
| 698,292 | 4/1902 | Kendall | 204—110 |
| 2,259,046 | 10/1941 | Roberts | 204—151 |
| 2,788,319 | 4/1957 | Pearson | 204—151 |
| 2,997,430 | 8/1961 | Föyn | 204—151 |
| 3,135,674 | 6/1964 | Ruetshi | 204—151 |
| 3,296,111 | 1/1967 | Miller et al. | 204—151 X |
| 3,457,152 | 7/1969 | Maloney, Jr. et al. | 204—131 |
| 3,616,356 | 10/1971 | Roy | 204—152 |

JOHN H. MACK, Primary Examiner

A. C. PRESCOTT, Assistant Examiner

U.S. Cl. X.R.

204—131, 149, 180 P